(12) United States Patent
Su et al.

(10) Patent No.: US 11,528,120 B2
(45) Date of Patent: Dec. 13, 2022

(54) DATA TRANSMISSION METHOD AND APPARATUS, AND COMPUTER STORAGE MEDIUM

(71) Applicant: China Academy of Telecommunications Technology, Beijing (CN)

(72) Inventors: Xin Su, Beijing (CN); Runhua Chen, Beijing (CN); Qiubin Gao, Beijing (CN); Tamrakar Rakesh, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 130 days.

(21) Appl. No.: 16/766,700

(22) PCT Filed: Oct. 11, 2018

(86) PCT No.: PCT/CN2018/109895
§ 371 (c)(1),
(2) Date: May 24, 2020

(87) PCT Pub. No.: WO2019/100859
PCT Pub. Date: May 31, 2019

(65) Prior Publication Data
US 2020/0287699 A1 Sep. 10, 2020

(30) Foreign Application Priority Data
Nov. 24, 2017 (CN) .......................... 201711192554.6

(51) Int. Cl.
*H04L 5/10* (2006.01)
*H04B 7/0413* (2017.01)
(Continued)

(52) U.S. Cl.
CPC ............. *H04L 5/10* (2013.01); *H04B 7/0413* (2013.01); *H04B 7/0634* (2013.01);
(Continued)

(58) Field of Classification Search
CPC ....... H04L 5/10; H04L 5/0051; H04L 5/0023; H04L 5/0092; H04B 7/0413;
(Continued)

(56) References Cited

U.S. PATENT DOCUMENTS 9,307,542 B2\* 4/2016 Hu .......................... H04L 5/0048
2012/0300728 A1\* 11/2012 Lee ....................... H04L 5/0023
370/329
(Continued)

FOREIGN PATENT DOCUMENTS

CN 102158319 A 8/2011
CN 102804625 A 11/2012
(Continued)

OTHER PUBLICATIONS

Catt, Further discussion on RS for phase tracking, 3GPP TSG RAN WG1 Meeting #88, Athens, Greece, Feb. 13-17, 2017, R1-1702088. (Year: 2017).\*
(Continued)

*Primary Examiner* — Shailendra Kumar
(74) *Attorney, Agent, or Firm* — Kilpatrick Townsend & Stockton, LLP

(57) ABSTRACT

Disclosed in the present application are a data transmission method and apparatus and a computer storage medium, to map a data layer to a DMRS port used in transmission according to a preset DMRS port ordering rule, and perform transmission. The data transmission method provided in an embodiment of the present application comprises: determining a preset demodulation reference signal (DMRS) port ordering rule; and mapping a data layer to a DMRS port used
(Continued)

Determining a preset DMRS port ordering rule — S101

Mapping one or more data layers to one or more DMRS ports used in transmission according to the preset DMRS port ordering rule, and sending the one or more data layers to a terminal — S102 in transmission according to the preset DMRS port ordering rule, and sending the data layer to a terminal.

8 Claims, 6 Drawing Sheets

(51) Int. Cl.
  *H04B 7/06* (2006.01)
  *H04L 5/00* (2006.01)
  *H04W 72/04* (2009.01)
  *H04W 72/12* (2009.01)
  *H04W 76/27* (2018.01)
  *H04W 80/02* (2009.01)

(52) U.S. Cl.
  CPC ......... *H04L 5/0051* (2013.01); *H04W 72/042* (2013.01); *H04W 72/1263* (2013.01); *H04W 76/27* (2018.02); *H04W 80/02* (2013.01)

(58) Field of Classification Search
  CPC . H04B 7/0634; H04B 17/373; H04W 72/042; H04W 72/1263; H04W 76/27; H04W 80/02; H04W 72/1289
  See application file for complete search history.

(56) References Cited

U.S. PATENT DOCUMENTS

2019/0052502 A1* 2/2019 Ren ................. H04L 5/0048
2019/0229871 A1* 7/2019 Shi ................. H04L 5/0048

FOREIGN PATENT DOCUMENTS

| CN | 103069761 A | 4/2013 | | |
|---|---|---|---|---|
| CN | 104079384 A | 10/2014 | | |
| CN | 104579595 A | 4/2015 | | |
| CN | 106712915 A | 5/2017 | | |
| CN | 107078874 A | 8/2017 | | |
| EP | 2536231 A1 | 12/2012 | | |
| EP | 2753013 A1 | 7/2014 | | |
| EP | 3232598 A1 | 10/2017 | | |
| EP | 3515141 A1 | 7/2019 | | |
| WO | 2011085509 A1 | 7/2011 | | |
| WO | WO-2011085509 A1 | * | 7/2011 | .......... H04B 7/0452 |
| WO | 2017181818 A1 | 10/2017 | | |
| WO | WO-2017181818 A1 | * | 10/2017 | .............. H04B 7/26 |

OTHER PUBLICATIONS

3GPP TS 38.211 V1.2.0 (Nov. 2017), 3rd Generation Partnership Project; Technical Specification Group Radio Access Network; NR; Physical channels and modulation (Year: 2017).*

3GPP TS 38.214 V1.2.0 (Nov. 2017), 3rd Generation Partnership Project; Technical Specification Group Radio Access Network; NR; Physical layer procedures for data (Year: 2017).*

Nokia et al.."Remaining details on NR-PBCH", 3GPP TSG-RAN WG1 NR AH#, Nagoya, Japan, Sep. 18-21, 2017, total 11 pages, R1-1716524.

Vivo, "Discussion on Remaining Minimum System Information", 3GPP TSG RAN WG1 Meeting #90bis, Prague, Czech Republic, Oct. 9-13, 2017, total 16 pages, R1-1717461.

CATT "Further discussion on RS for phase tracking", 3GPP TSG RAN WG1 Meeting #88, Athens, Greece, Feb. 13-17, 2017, total 5 pages, R1-1702088.

3GPP TS 38.211 V1.2.0,3rd Generation Partnership Project; Technical Specification Group Radio Access Network;NR; Physical channels and modulation (Release 15), total 59 pages, Nov. 2017.

3GPP TS 38.214 V1.2.0, 3rd Generation Partnership Project;Technical Specification Group Radio Access Network; NR;Physical layer procedures for data (Release 15), total 54 pages, Nov. 2017.

* cited by examiner

DATA TRANSMISSION METHOD AND APPARATUS, AND COMPUTER STORAGE MEDIUM

This application is a National Stage of International Application No. PCT/CN2018/109895, filed Oct. 11, 2018, which claims priority to Chinese patent application No. 201711192554.6, filed with Chinese Patent Office on Nov. 24, 2017, entitled "Data Transmission Method and Apparatus, and Computer Storage Medium", which is incorporated herein by reference in its entirety.

FIELD

The present application relates to the field of communication technologies, and in particular, to a data transmission method and apparatus, and a computer storage medium.

BACKGROUND

In a new radio (NR) system, a data demodulation process requires channel estimation based on a demodulation reference signal (DMRS). In the related art, the DMRS in the NR system is transmitted in the same precoding manner as a corresponding data layer.

SUMMARY

Embodiments of the present application provide a data transmission method and apparatus and a computer storage medium, to map a data layer to a DMRS port used in transmission according to a preset DMRS port ordering rule, and perform transmission.

On the network side, a data sending method provided in an embodiment of the present application includes: determining a preset DMRS port ordering rule; and mapping one or more data layers to one or more DMRS ports used in transmission according to the preset DMRS port ordering rule, and sending the one or more data layers to a terminal.

By adopting the data sending method, a preset DMRS port ordering rule is determined; and a data layer is mapped to a DMRS port used in transmission according to the preset DMRS port ordering rule, and the data layer is sent to a terminal, to map a data layer to a DMRS port used in transmission according to a preset DMRS port ordering rule, and perform transmission.

In one embodiment, the mapping the one or more data layers to the one or more DMRS ports used in transmission according to the preset DMRS port ordering rule, and sending the one or more data layers to the terminal includes: based on a number v of MIMO (Multiple-Input Multiple-Output) parallel transmission data layers, arranging the one or more data layers into the following transmission signal vector according to serial numbers:

$$\begin{bmatrix} x^{(0)}(i) \\ \vdots \\ x^{(v-1)}(i) \end{bmatrix};$$

determining the following signal vector formed by v DMRS ports:

$$\begin{bmatrix} y^{(P_0)}(i) \\ \vdots \\ y^{(P_{v-1})}(i) \end{bmatrix};$$

and
mapping the v data layers to the v DMRS ports according to the following formula, and sending the data layers to a terminal:

$$\begin{bmatrix} y^{(P_0)}(i) \\ \vdots \\ y^{(P_{v-1})}(i) \end{bmatrix} = \begin{bmatrix} x^{(0)}(i) \\ \vdots \\ x^{(v-1)}(i) \end{bmatrix}.$$

$i=0, 1, \ldots, M_{symb}^{layer}-1$, i represents the ith modulation symbol among $M_{symb}^{layer}$ modulation symbols to be transmitted in each data layer; and $P_0, \ldots, P_{v-1}$ represents serial numbers of the v DMRS ports.

In one embodiment, the method further includes: determining QCL (Quasi-Co-Location) group information of the one or more DMRS ports; and notifying the terminal of the QCL group information.

In one embodiment, if there is only one QCL group or CDM (Code Division Multiplexing) group, then $P_0<P_1<, \ldots, P_{v-1}$.

In one embodiment, if there are a plurality of QCL groups or CDM groups, the signal vector formed by the v DMRS ports is determined according to an ordering result of the serial numbers of the v DMRS ports.

In one embodiment, the ordering result is obtained by: ordering, within each subset, the serial numbers of DMRS ports in the DMRS port subset to obtain an ordering result, within each subset, of the DMRS port serial numbers corresponding to the DMRS port subset; and performing ordering between DMRS port subsets based on the ordering result, within each subset, of the DMRS port serial numbers corresponding to the DMRS port subset, where each DMRS port subset is a set formed by DMRS ports included in a CDM group or QCL group.

In one embodiment, ordering between DMRS port subsets is performed by: performing ordering between DMRS port subsets based on the smallest DMRS port serial number in each DMRS port subset; or performing ordering between DMRS port subsets based on a serial number of the CDM group or QCL group corresponding to each DMRS port subset; or performing ordering between DMRS port subsets based on the number of DMRS ports included in each DMRS port subset.

In one embodiment, the QCL group information includes one of the following information: in a DMRS pattern, an identifier corresponding to a reference signal having a QCL relationship with each CDM group, where DMRS ports included in a CDM group having the same identifier form a same QCL group, and the identifiers corresponding to DMRS ports of different QCL groups are different, and the identifiers corresponding to DMRS ports of a same QCL group are same; a CDM group included in a QCL group; and a list of DMRS ports included in a QCL group.

In one embodiment, the QCL group information of the one or more DMRS ports is notified to the terminal in a broadcast, multicast or terminal-specific manner, through RRC (Radio Resource Control) configuration or a MAC (Media Access Control) CE (Control Element) or DCI (Downlink Control Information).

Correspondingly, on the terminal side, a data receiving method provided in an embodiment of the present application includes: determining a preset DMRS port ordering rule; and receiving one or more sent data layers mapped to one or more DMRS ports according to the preset DMRS port ordering rule.

In one embodiment, receiving one or more sent data layer mapped to one or more DMRS ports according to the preset DMRS port ordering rule includes:
based on a number v of MIMO parallel transmission data layers, arranging the one or more data layers into the following transmission signal vector according to serial numbers:

$$\begin{bmatrix} x^{(0)}(i) \\ \vdots \\ x^{(v-1)}(i) \end{bmatrix};$$

determining the following signal vector formed by v DMRS ports:

$$\begin{bmatrix} y^{(p_0)}(i) \\ \vdots \\ y^{(p_{v-1})}(i) \end{bmatrix};$$

and
receiving the one or more sent data layers mapped to the one or more DMRS ports used in transmission, according to the following formula $$\begin{bmatrix} y^{(p_0)}(i) \\ \vdots \\ y^{(p_{v-1})}(i) \end{bmatrix} = \begin{bmatrix} x^{(0)}(i) \\ \vdots \\ x^{(v-1)}(i) \end{bmatrix}.$$

i=0, 1 . . . , $M_{symb}^{layer}$−1, i represents the ith modulation symbol among $M_{symb}^{layer}$ modulation symbols to be transmitted in each data layer; and $P_0, \ldots, P_{v-1}$ represents serial numbers of the v DMRS ports.

In one embodiment, the method further includes: receiving QCL group information of the one or more DMRS ports notified by the network side.

In one embodiment, if there is only one QCL group or CDM group, then $P_0 < P_1 <, \ldots, P_{v-1}$.

In one embodiment, if there are a plurality of QCL groups or CDM groups, the signal vector formed by the v DMRS ports is determined according to an ordering result of the serial numbers of the v DMRS ports.

In one embodiment, the ordering result is obtained by: ordering, within each subset, the serial numbers of DMRS ports in the DMRS port subset to obtain an ordering result, within each subset, of the DMRS port serial numbers corresponding to the DMRS port subset; and performing ordering between DMRS port subsets based on the ordering result, within each subset, of the DMRS port serial numbers corresponding to the DMRS port subset, where each DMRS port subset is a set formed by DMRS ports included in a CDM group or QCL group.

In one embodiment, ordering between DMRS port subsets is performed by: performing ordering between DMRS port subsets based on the smallest DMRS port serial number in each DMRS port subset; or performing ordering between DMRS port subsets based on a serial number of the CDM group or QCL group corresponding to each DMRS port subset; or performing ordering between DMRS port subsets based on the number of DMRS ports included in each DMRS port subset.

In one embodiment, the QCL group information includes one of the following information: in a DMRS pattern, an identifier corresponding to a reference signal having a QCL relationship with each CDM group, where DMRS ports included in a CDM group having the same identifier form a same QCL group, and the identifiers corresponding to DMRS ports of different QCL groups are different, and the identifiers corresponding to DMRS ports of a same QCL group are same; a CDM group included in a QCL group; and a list of DMRS ports included in a QCL group.

In one embodiment, the notification is received in a broadcast, multicast, or terminal-specific manner, and the QCL group information of the one or more DMRS ports is acquired from RRC configuration or an MAC CE or DCI in the notification.

On the network side, a data transmission apparatus provided in an embodiment of the present application includes a memory and a processor, where the memory is configured to store program instructions, and the processor is configured to call the program instructions stored in the memory, and execute the following steps according to obtained programs: determining a preset DMRS port ordering rule; and mapping one or more data layers to one or more DMRS ports used in transmission according to the preset DMRS port ordering rule, and sending the one or more data layers to a terminal.

In one embodiment, the processor mapping the one or more data layers to the one or more DMRS ports used in transmission according to the preset DMRS port ordering rule, and sending the one or more data layers to the terminal includes:
based on a number v of MIMO parallel transmission data layers, arranging the one or more data layers into the following transmission signal vector according to serial numbers:

$$\begin{bmatrix} x^{(0)}(i) \\ \vdots \\ x^{(v-1)}(i) \end{bmatrix};$$

determining the following signal vector formed by v DMRS ports:

$$\begin{bmatrix} y^{(p_0)}(i) \\ \vdots \\ y^{(p_{v-1})}(i) \end{bmatrix};$$

and mapping the v data layers to the v DMRS ports according to the following formula, and sending the data layers to a terminal:

$$\begin{bmatrix} y^{(p_0)}(i) \\ \vdots \\ y^{(p_{v-1})}(i) \end{bmatrix} = \begin{bmatrix} x^{(0)}(i) \\ \vdots \\ x^{(v-1)}(i) \end{bmatrix}.$$

$i=0, 1, \ldots, M_{symb}^{layer}-1$, i represents the ith modulation symbol among $M_{symb}^{layer}$ modulation symbols to be transmitted in each data layer; and $P_0, \ldots, P_{v-1}$ represents serial numbers of the v DMRS ports.

In one embodiment, the processor is further configured to: determine QCL group information of the one or more DMRS ports; and notify the terminal of the QCL group information.

In one embodiment, if there is only one QCL group or CDM group, then $P_0 < P_1 <, \ldots, P_{v-1}$.

In one embodiment, if there are a plurality of QCL groups or CDM groups, the signal vector formed by the v DMRS ports is determined according to an ordering result of the serial numbers of the v DMRS ports.

In one embodiment, the ordering result is obtained by: ordering, within each subset, the serial numbers of DMRS ports in the DMRS port subset to obtain an ordering result, within each subset, of the DMRS port serial numbers corresponding to the DMRS port subset; and performing ordering between DMRS port subsets based on the ordering result, within each subset, of the DMRS port serial numbers corresponding to the DMRS port subset, where each DMRS port subset is a set formed by DMRS ports included in a CDM group or QCL group.

In one embodiment, ordering between DMRS port subsets is performed by: performing ordering between DMRS port subsets based on the smallest DMRS port serial number in each DMRS port subset; or performing ordering between DMRS port subsets based on a serial number of the CDM group or QCL group corresponding to each DMRS port subset; or performing ordering between DMRS port subsets based on the number of DMRS ports included in each DMRS port subset.

In one embodiment, the QCL group information includes one of the following information: in a DMRS pattern, an identifier corresponding to a reference signal having a QCL relationship with each CDM group, where DMRS ports included in a CDM group having the same identifier form a same QCL group, and the identifiers corresponding to DMRS ports of different QCL groups are different, and the identifiers corresponding to DMRS ports of a same QCL group are same; a CDM group included in a QCL group; and a list of DMRS ports included in a QCL group.

In one embodiment, the processor notifies the QCL group information of the one or more DMRS ports to the terminal in a broadcast, multicast or terminal-specific manner, through RRC configuration or an MAC CE or DCI.

On the terminal side, a data receiving apparatus provided in an embodiment of the present application includes a memory and a processor, where the memory is configured to store program instructions, and the processor is configured to call the program instructions stored in the memory, and execute the following steps according to obtained programs: determining a preset DMRS port ordering rule; and receiving one or more sent data layers mapped to one or more DMRS ports according to the preset DMRS port ordering rule.

In one embodiment, the receiving one or more sent data layers mapped to one or more DMRS ports according to the preset DMRS port ordering rule includes:
based on a number v of MIMO parallel transmission data layers, arranging the one or more data layers into the following transmission signal vector according to serial numbers:

$$\begin{bmatrix} x^{(0)}(i) \\ \vdots \\ x^{(v-1)}(i) \end{bmatrix};$$

determining the following signal vector formed by v DMRS ports:

$$\begin{bmatrix} y^{(p_0)}(i) \\ \vdots \\ y^{(p_{v-1})}(i) \end{bmatrix};$$

and receiving a sent data layer mapped to a DMRS port used in transmission, according to the following formula:

$$\begin{bmatrix} y^{(p_0)}(i) \\ \vdots \\ y^{(p_{v-1})}(i) \end{bmatrix} = \begin{bmatrix} x^{(0)}(i) \\ \vdots \\ x^{(v-1)}(i) \end{bmatrix}.$$

$i=0, 1, \ldots, M_{symb}^{layer}-1$, i represents the ith modulation symbol among $M_{symb}^{layer}$ modulation symbols to be transmitted in each data layer; and $P_0, \ldots, P_{v-1}$ represents serial numbers of the v DMRS ports.

In one embodiment, the processor is further configured to receive QCL group information of the one or more DMRS ports notified by the network side.

In one embodiment, if there is only one QCL group or CDM group, then $P_0 < P_1 <, \ldots, P_{v-1}$.

In one embodiment, if there are a plurality of QCL groups or CDM groups, the signal vector formed by the v DMRS ports is determined according to an ordering result of the serial numbers of the v DMRS ports.

In one embodiment, the ordering result is obtained by: ordering, within each subset, the serial numbers of DMRS ports in the DMRS port subset to obtain an ordering result, within each subset, of the DMRS port serial numbers corresponding to the DMRS port subset; and performing ordering between DMRS port subsets based on the ordering result, within each subset, of the DMRS port serial numbers corresponding to the DMRS port subset, where each DMRS port subset is a set formed by DMRS ports included in a CDM group or QCL group.

In one embodiment, the processor performs ordering between DMRS port subsets by: performing ordering between DMRS port subsets based on the smallest DMRS port serial number in each DMRS port subset; or performing ordering between DMRS port subsets based on a serial number of the CDM group or QCL group corresponding to each DMRS port subset; or performing ordering between DMRS port subsets based on the number of DMRS ports included in each DMRS port subset.

In one embodiment, the QCL group information includes one of the following information: in a DMRS pattern, an identifier corresponding to a reference signal having a QCL relationship with each CDM group, where DMRS ports included in a CDM group having the same identifier form a same QCL group, and the identifiers corresponding to DMRS ports of different QCL groups are different, and the identifiers corresponding to DMRS ports of a same QCL group are same; a CDM group included in a QCL group; and a list of DMRS ports included in a QCL group.

In one embodiment, the processor receives the notification in a broadcast, multicast, or terminal-specific manner, and acquires the QCL group information of the one or more DMRS ports from RRC configuration or a MAC CE or DCI in the notification.

On the network side, another data sending apparatus provided in an embodiment of the present application includes: a determining device configured to determine a preset DMRS port ordering rule; and a sending device configured to map one or more data layers to one or more DMRS ports used in transmission according to the preset DMRS port ordering rule, and send the one or more data layers to a terminal.

On the terminal side, another data receiving apparatus provided in an embodiment of the present application includes: a determining device configured to determine a preset DMRS port ordering rule; and a receiving device configured to receive one or more sent data layer mapped to one or more DMRS ports according to the preset DMRS port ordering rule.

Another embodiment of the present application provides a computer storage medium storing computer-executable instructions, which are used for causing a computer to execute any foregoing method.

BRIEF DESCRIPTION OF THE DRAWINGS

The embodiments of the present application more clearly, drawings used in description of the embodiments will be introduced briefly below. The drawings described below show some embodiments of the present application.

DETAILED DESCRIPTION OF THE EMBODIMENTS

Embodiments of the present application provide a data transmission method and apparatus and a computer storage medium, to map a data layer to a DMRS port used in transmission according to a preset DMRS port ordering rule, and perform transmission.

DMRS basic pattern (front-load DMRS) configurations include the following.

Configuration 1.

The number of DMRS symbol is 1: by using combination (comb) 2+ cyclic shifts (CS) 2, maximally 4 ports are supported.

Figure 1:
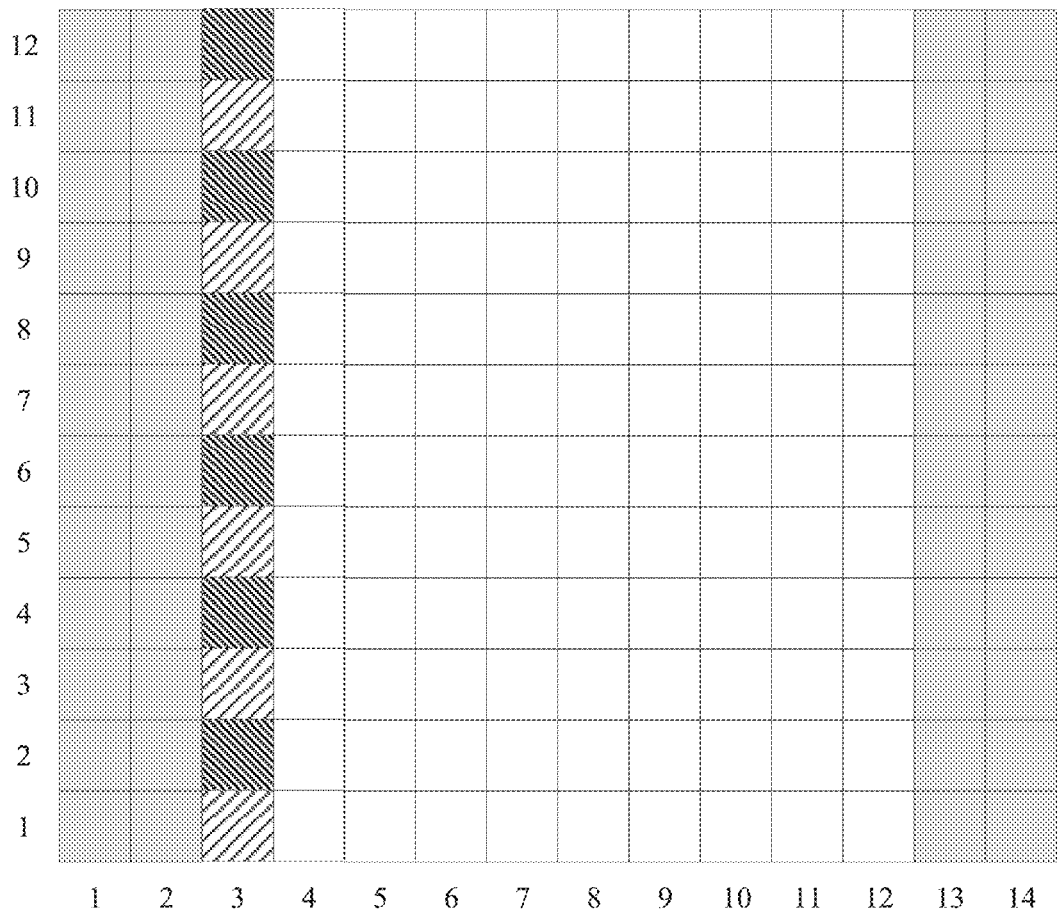
FIG. 1 is a schematic diagram of a first DMRS pattern provided in an embodiment of the present application.

As shown FIG. 1, comb2 indicates frequency domain multiplexing. In one embodiment, ports 0 and 2 have a multiplexing relationship of comb2. CS2 indicates that a sequence between ports is multiplexed by cyclic shifts. In one embodiment, ports 0 and 1 have a multiplexing relationship of CS2.

The number of DMRS symbols is 2: by using comb2+ CS2+TD-OCC($\{1, 1\}$ and $\{1, -1\}$), maximally 8 ports are supported. TD-OCC ($\{1, 1\}$ and $\{1, -1\}$) indicate that time-domain orthogonal cover code (TD-OCC) multiplexing is adopted between two ports, and $\{1, 1\}$ and $\{1, -1\}$ are multiplexing coefficients of the two ports, respectively.

Figure 2:
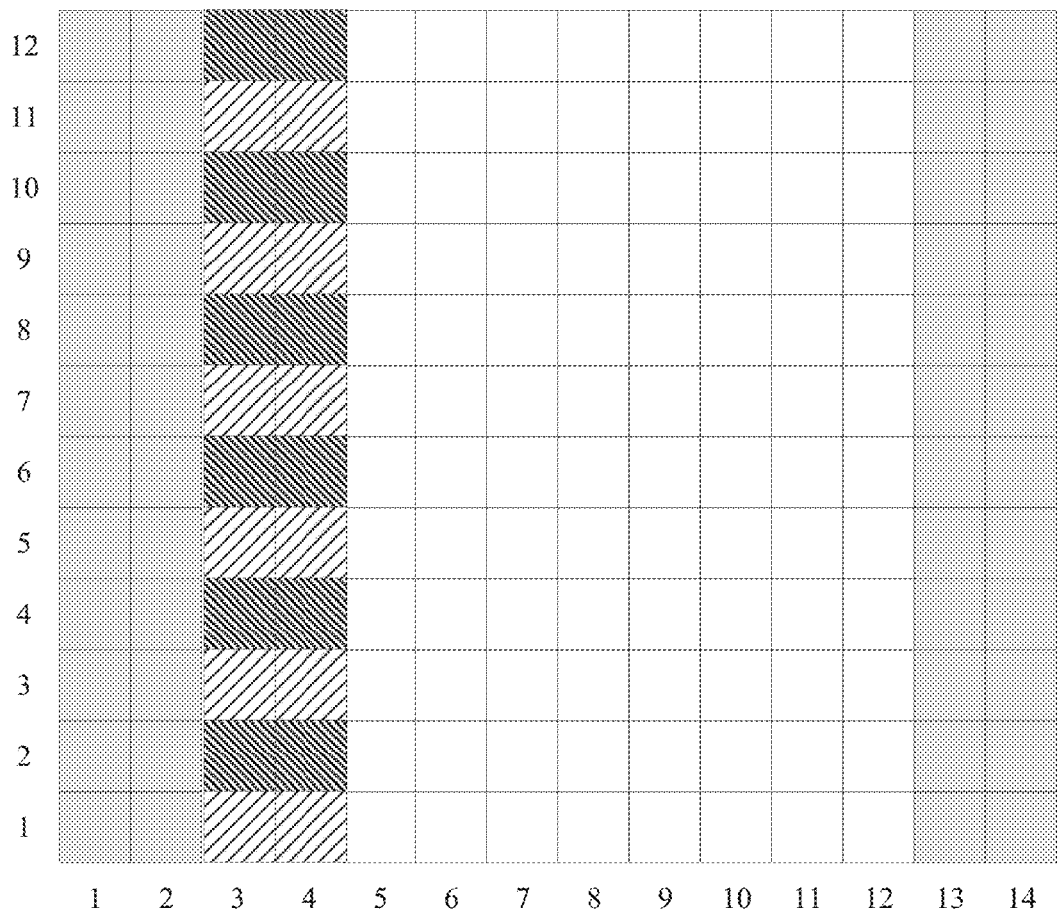
FIG. 2 is a schematic diagram of a second DMRS pattern provided in an embodiment of the present application.

As shown in FIG. 2, TD-OCC indicates time-domain orthogonal cover code (OCC) multiplexing. In one embodiment, time-domain OCC multiplexing is adopted between ports 0/1 and 4/5. CS2 multiplexing is adopted between port 0 and port 1, CS2 multiplexing is adopted between port 4 and port 5, and time domain OCC multiplexing is adopted between port 0/1 and port 4/5.

Configuration 2.

The number of DMRS symbol is 1: by using 2-FD-OCC (adjacent frequency domain resource element (RE)), maximally 6 ports are supported.

Figure 3:
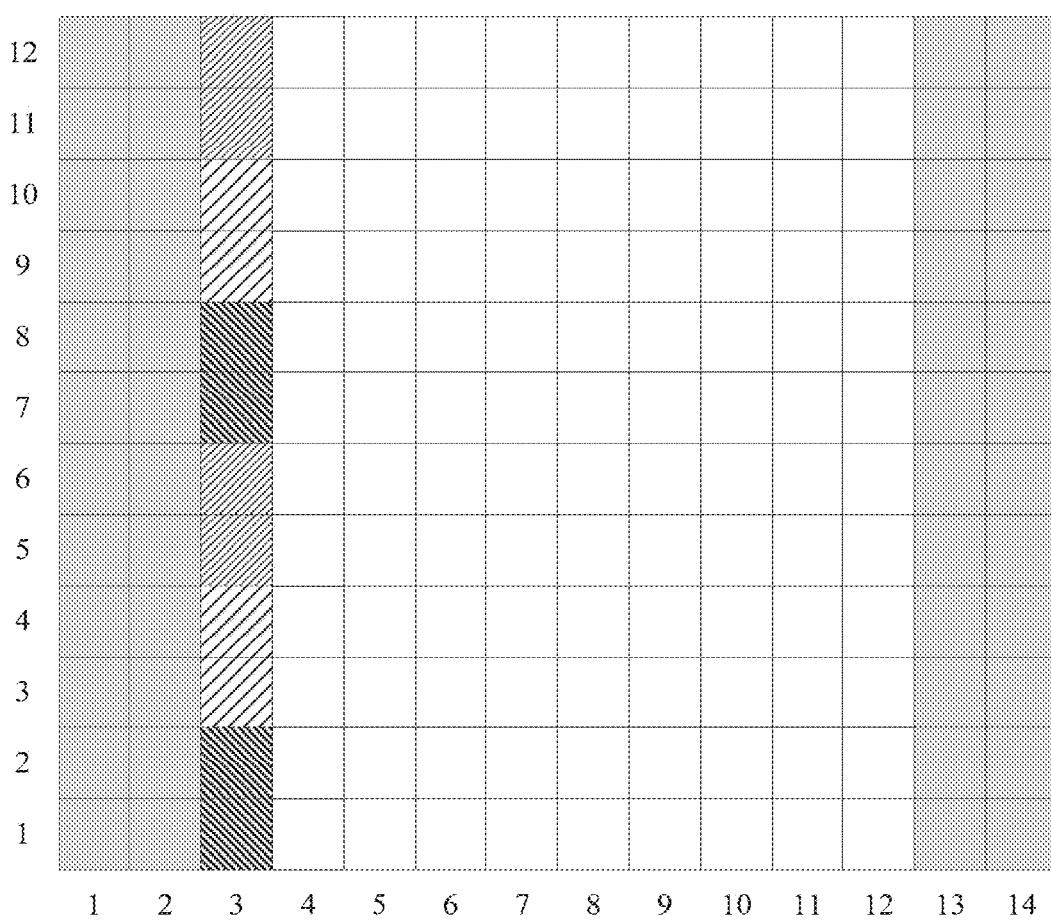
FIG. 3 is a schematic diagram of a third DMRS pattern provided in an embodiment of the present application.

As shown in FIG. 3, 2-FD-OCC indicates frequency domain OCC multiplexing. In one embodiment, frequency domain OCC multiplexing is adopted between ports 0 and 1. In addition, frequency-division multiplexing (FDM) is adopted with other ports. In one embodiment, FDM is used between ports 0/1 and 2/3.

The number of DMRS symbols is 2: by adopting 2-FD-OCC (adjacent frequency domain RE)+TD-OCC ($\{1, 1\}$ and $\{1, -1\}$), maximally 12 ports are supported.

Figure 4:
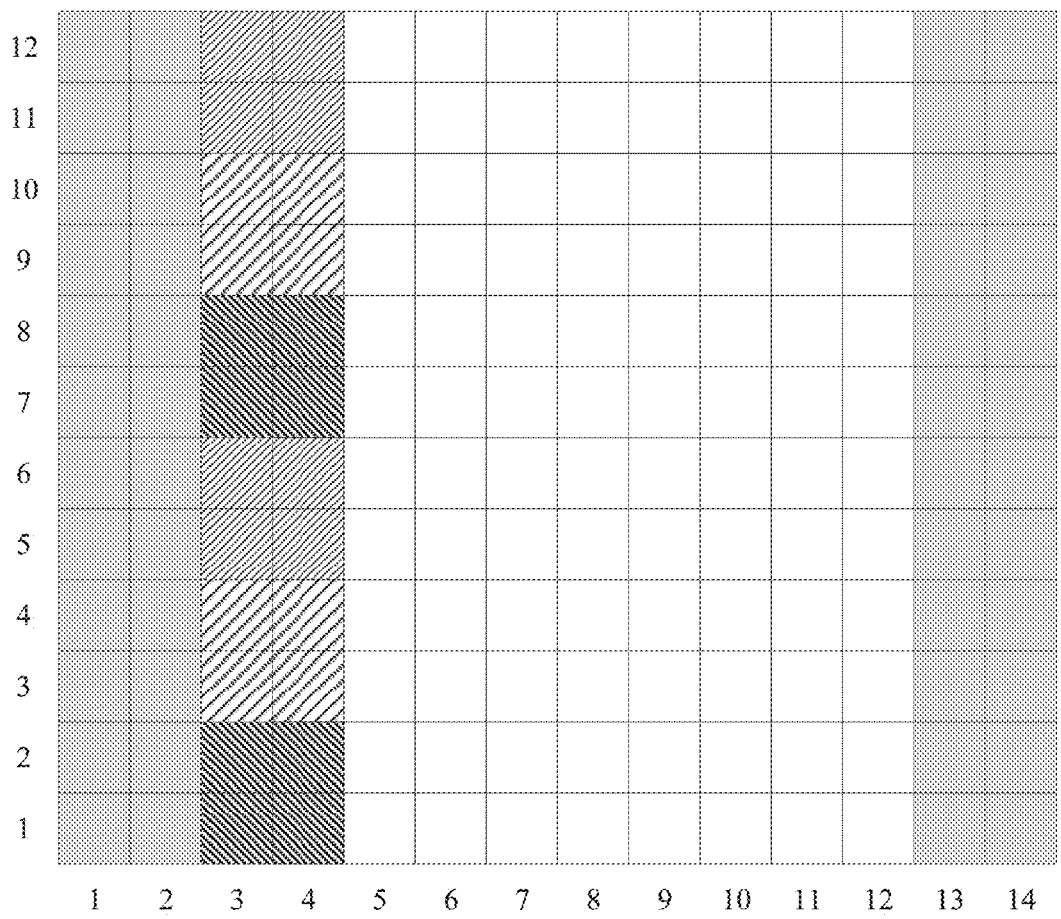
FIG. 4 is a schematic diagram of a fourth DMRS pattern provided in an embodiment of the present application.

As shown in FIG. 4, TD-OCC indicates time-domain OCC multiplexing. In one embodiment, time-domain OCC multiplexing is adopted between ports 0/1 and 6/7.

It can be seen from the various pilot patterns of the DMRS described above that in configuration 1, if the number of maximally supported ports does not exceed 4, the pattern in FIG. 1 can be used for configuration, and if the number of maximally supported ports exceeds 4, but does not exceed 8, the pattern in FIG. 2 can be used for configuration; and in configuration 2, if the number of maximally supported ports does not exceed 6, the pattern in FIG. 3 can be used for configuration: and if the number of maximally supported ports exceeds 6, but does not exceed 12, the pattern in FIG. 4 can be used for configuration. The number of ports described here refers to the total number of ports of all terminals multiplexed at each resource location.

Additionally, in FIGS. 1 to 4, the first two columns represent control symbol fields, that is, symbol positions required for a downlink control channel; and the last two columns can be symbol positions required for an uplink control channel, that is, symbol resources of a data channel that cannot be used for a physical downlink shared channel (PDSCH).

In an NR system, multiple transport receive points (TRPs)/antenna panels or sub-arrays may be considered for coordinated transmission. In this case, signals sent by different TRPs/panels may have relatively independent large-scale features, such as an average delay, delay spread, average Doppler shift, Doppler spread, and airspace reception parameter. Therefore, in NR, if large-scale parameters of two or more reference signal channels are consistent, it is called quasi-co-location (QCL). Otherwise, it is called non-QCL. The large-scale parameters are, in one embodiment, an average delay, delay spread, Doppler shift, Doppler spread, spatial reception parameter, average received power, and the like. Moreover, the QCL is further explained as follows: the terminal cannot determine that received reference signal ports are from sites or antenna sub-arrays at same or different physical locations, and if parameters (or a subset thereof) such as the average delay, delay spread. Doppler shift, Doppler spread, spatial reception parameter, and average reception power of two reference signal ports are same, the two reference signals can be regarded as quasi-co-located in the sense of the aforementioned large-scale parameters.

For DMRS ports, the concept of a QCL group is defined in an NR system, that is, a QCL group of DMRS ports (QCL group for short): DMRS ports in a QCL group are QCL, and DMRS ports in different QCL groups are not QCL. It is specified in the NR system that DMRS ports in a same code division multiplexing (CDM) group have a QCL relationship. That is, in a CDM group, reference signal ports occupy the same time-frequency resource, and are distinguished by orthogonal codewords. Using FIG. 4 as an example, due to characteristics of the DMRS design, in the case of one DMRS symbol, ports 0/1 are in a CDM relationship, ports 2/3 are in a CDM relationship, and ports 0/1 and port 2/3 are in an FDM relationship. In FIGS. 1 to 4, adjacent blocks that are filled in a same way constitute a CDM group. Each data channel can support two QCL groups. The data channel is, in one embodiment, a physical downlink shared channel (PDSCH).

A QCL group of DMRS ports described in the embodiments of the present application may be referred to as a QCL group for short, and may also be referred to as a DMRS group.

The DMRS port described in the embodiments of the present application may be referred to as a port for short, and may also be referred to as an antenna port.

A specific scheme provided in an embodiment of the present application includes the following steps.

Step I: the network side indicates QCL group information (for indicating QCL grouping of DMRS ports) of DMRS ports through control signaling. The content of the QCL group information of the DMRS ports is content as indicated in the following mode 1-1, 1-2 or 1-3.

CDM groups in a DMRS pattern are denoted by: CDM group 1, CDM group 2, . . . , CDM group N. In one embodiment, according to the current DMRS pattern (referring to FIGS. 1 to 4), there are a maximum of two CDM groups in DMRS configuration type 1 and a maximum of three CDM groups in DMRS configuration type 2.

Mode 1-1 (in one embodiment, notification can be made by DCI or MAC CE).

An identifier corresponding to a reference signal having a QCL relationship with each CDM group (that is, a QCL reference source of each DMRS port in a CDM group n) in a DMRS pattern is respectively notified through control signaling. In one embodiment, a reference signal having a QCL relationship with the CDM group n is Ref_n, and a corresponding identifier is ID_n; that is, only the ID_n needs to be notified, and the terminal can determine, according to the ID_n, that the reference signal having a QCL relationship with the CDM group n is Ref_n, and perform QCL grouping according to QCL reference sources; that is, DMRS ports included in CDM groups having the same identifier ID_n form a same QCL group, and the identifiers ID_n corresponding to DMRS ports of different QCL groups are different, and the identifiers ID_n corresponding to DMRS ports of a same QCL group are same.

For CDM groups with a same reference source reference signal identifier, a set formed by DMRS ports included therein can be considered as one QCL group of DMRS ports. It should be noted that "one" here means that one group, but not one DMRS port, that is one QCL group, or DMRS group for short.

Mode 1-2: CDM groups included in a QCL group i are directly indicated through control signaling. In one embodiment, for DMRS configuration type 2, the control signaling can indicate that QCL group 1 includes CDM groups 1 and 2, and QCL group 2 includes CDM group 3.

Mode 1-3: A list of DMRS ports included in a QCL group i is directly indicated through control signaling. In one embodiment, for DMRS configuration type 2, if the number of data layers is 8, the control signaling can indicate that QCL group 1 includes DMRS ports 0, 1, 6, 7, and QCL group 2 includes DMRS ports 2, 3, 8, 9.

In the above process, the control information (i.e. QCL group information of DMRS ports) for indicating QCL grouping of DMRS ports can be notified to the terminal in a broadcast, multicast, or terminal-specific manner through radio resource control (RRC) configuration or media access control (MAC) control element (CE), or downlink control information (DCI).

Moreover, it should be noted that, for the present application, step I described above is not a step that must be performed, but an optional step; that is, the following steps can exist independently. If step I exists, the terminal can further determine an ordering manner of the DMRS ports occupied by the terminal, according to the QCL group information of the DMRS ports notified by the network side, in conjunction with a preset ordering rule of DMRS ports (the specific rule can be determined according to actual needs; exemplary description of some rules are provided in the following embodiments, but the present disclosure is not limited to the rules).

Step II: based on a number (i.e. a number of ranks) v of multiple-input multiple-output (MIMO) parallel transmission data layers, arranging the transmission data layers (each data layer is a data stream) into the following transmission signal vector according to serial numbers:

$$\begin{bmatrix} x^{(0)}(i) \\ \vdots \\ x^{(v-1)}(i) \end{bmatrix}.$$

That is, X is a column vector with v elements, and superscripts 0, . . . , v−1 are serial numbers of the elements. i.e. serial numbers of the data layers, where i=0, 1, . . . , $M_{symb}^{layer}-1$ represents the ith of $M_{symb}^{layer}$ modulation symbols to be transmitted in each data layer.

Let Y be a signal vector including v DMRS ports, where ports included in a set $\{P_0, \ldots, P_{v-1}\}$ are indicated by the DCI, and the ordering manner is determined by step III.

$$\begin{bmatrix} y^{(P_0)}(i) \\ \vdots \\ y^{(P_{v-1})}(i) \end{bmatrix}.$$

Y is a column vector with v elements, and superscripts $P_0, \ldots, P_{v-1}$ are numerals of the elements in y, and the superscripts $P_0, \ldots, P_{v-1}$ are serial numbers of v DMRS ports, $i=0, 1, \ldots, M_{symb}^{layer}-1$ represents the ith of $M_{symb}^{layer}$ modulation symbols to be transmitted in each data layer.

Step III: mapping one or more data layers to one or more DMRS ports used in transmission according to a preset DMRS port ordering rule, and performing transmission. Optional modes are as illustrated in the following modes 3-1, 3-2, 3-3, 3-4, 3-5.

Mode 3-1.

Case I: If there is only one QCL group or CDM group: the serial numbers of the v DMRS ports allocated to the terminal in the DCI are ordered so that $P_0 < P_1 < \ldots, P_{v-1}$, which is a preset DMRS port ordering rule; and the v data layers (also called data layers of data, each data layer data is each data layer, and the number v of data layers of data for simultaneous parallel transmission is the number v of data layers of data for simultaneous parallel transmission) are mapped to the v DMRS ports.

$$\begin{bmatrix} y^{(P_0)}(i) \\ \vdots \\ y^{(P_{v-1})}(i) \end{bmatrix} = \begin{bmatrix} x^{(0)}(i) \\ \vdots \\ x^{(v-1)}(i) \end{bmatrix}.$$

The above formula indicates that the corresponding elements in the vector are equal; that is, a data layer $y^{(P_0)}(i)$ is mapped to a DMRS port $x^{(0)}(i)$ used in transmission, and similarly, a data layer $y^{(P_{v-1})}(i)$ is mapped to a DMRS port $x^{(v-1)}(i)$ used in transmission; the same formula is used similarly in the following mapping, which will not be described here.

In one embodiment, for DMRS configuration type 2, if the number of data layers is v=8, and DMRS ports 0, 1, 6, 7 and ports 2, 3, 8, 9 in the DCI are allocated to the terminal, then data layers 0, 1, 2, 3, 4, 5, 6, 7, 8 are mapped to the DMRS ports 0, 1, 2, 3, 6, 7, 8, 9 used in transmission.

Case II: If there are multiple QCL groups or CDM groups: ordering is performed within a port group, that is, ordering, within each subset, the serial numbers of DMRS ports in the DMRS port subset to obtain an ordering result, within each subset, of the DMRS port serial numbers corresponding to the DMRS port subset, including: according to the QCL group information of the DMRS ports configured/indicated in step I, ordering the DMRS ports indicated in the DCI, in the respective QCL groups to which the DMRS ports belong, where the serial numbers of the DMRS ports in each QCL group are arranged in ascending order (from small to large); and ordering is performed among port groups, that is, performing ordering between DMRS port subsets based on the ordering result, within each subset, of the DMRS port serial numbers corresponding to the DMRS port subset, including: in the port subsets obtained by grouping and ordering as described above, the port subsets are further ordered in ascending order (from small to large) based on the smallest DMRS port serial number in each subset; that is, among the subsets, a subset in which the smallest DMRS port serial number is smaller is prior in the order (of course, ordering of the DMRS port serial numbers among the subsets may also be performed according to other principles; in one embodiment, among the subsets, a subset in which the largest DMRS port serial number is larger is prior in the order), where each port subset, subset for short, is DMRS ports in one QCL group.

Each DMRS port subset described in the embodiments of the present application is a set formed by DMRS ports included in each CDM group or QCL group.

The combination of ordering within a port group and the ordering among port groups described above can be regarded as another preset DMRS port ordering rule. The same applies to the following modes, and will not be repeated later.

The v DMRS ports are arranged into a vector according to an ordering result described above:

$$\begin{bmatrix} y^{(P_0)}(i) \\ \vdots \\ y^{(P_{v-1})}(i) \end{bmatrix}.$$

The v data layers are mapped to the v DMRS ports according to the following formula:

$$\begin{bmatrix} y^{(P_0)}(i) \\ \vdots \\ y^{(P_{v-1})}(i) \end{bmatrix} = \begin{bmatrix} x^{(0)}(i) \\ \vdots \\ x^{(v-1)}(i) \end{bmatrix}.$$

In one embodiment, for DMRS configuration type 2, if the number of data layers is v=8, and DMRS ports 0, 1, 6, 7 and ports 2, 3, 8, 9 in the DCI are allocated to the terminal, then from step I, the terminal learns that its DMRS ports are divided into two QCL groups corresponding to subset 1 (including ports {0, 1, 6, 7} (ascending order)) and subset 2 (including ports {2, 3, 8, 9} (ascending order)), respectively. As the smallest DMRS port serial number in port subset 1 is 0, and is smaller than the smallest DMRS port serial number 2 in subset 2, the port subsets are further ordered; that is, subset 1 is arranged prior to subset 2, and the ports are in the order of 0, 1, 6, 7, 2, 3, 8, 9; as a result, $P_0, P_1, P_2, P_3$ are equal to 0, 1, 6, 7, respectively, and $P_4, P_5, P_6, P_7$ are equal to 2, 3, 8, 9, respectively. Finally, the v data layers are mapped to the v DMRS ports according to the following formula:

$$\begin{bmatrix} y^{(P_0)}(i) \\ \vdots \\ y^{(P_{v-1})}(i) \end{bmatrix} = \begin{bmatrix} x^{(0)}(i) \\ \vdots \\ x^{(v-1)}(i) \end{bmatrix}.$$

That is, data layers 0, 1, 2, 3, 4, 5, 6, 7, 8 are mapped to DMRS ports 0, 1, 6, 7, 2, 3, 8, 9 used in transmission, respectively.

Mode 3-2.

Ordering within a port group: according to the CDM group relationships of the DMRS ports in the DMRS pattern, the DMRS ports indicated in the DCI are ordered in the respective CDM groups to which the ports belong, where the serial numbers of the DMRS ports in each CDM group are arranged in ascending order (from small to large).

Ordering among port groups: in the port subsets obtained by grouping and ordering as described above, the port subsets are further ordered in ascending order (from small to large) based on the smallest DMRS port serial number in each subset; that is, a subset in which the smallest DMRS port serial number is smaller is prior in the order, where each subset is DMRS ports in one CDM group.

The v DMRS ports are arranged into a vector according to ordering described above:

$$\begin{bmatrix} y^{(p_0)}(i) \\ \vdots \\ y^{(p_{v-1})}(i) \end{bmatrix}.$$

The v data layers are mapped to the v DMRS ports according to the following formula:

$$\begin{bmatrix} y^{(p_0)}(i) \\ \vdots \\ y^{(p_{v-1})}(i) \end{bmatrix} = \begin{bmatrix} x^{(0)}(i) \\ \vdots \\ x^{(v-1)}(i) \end{bmatrix}.$$

In one embodiment, for DMRS configuration type 2, if the number of data layers is v=8, and DMRS ports 0, 1, 6, 7 and ports 2, 3, 8, 9 in the DCI are allocated to the terminal, then from the DMRS pattern, the terminal learns that its DMRS ports are divided into two CDM groups corresponding to CDM group 1 (including ports {0, 1, 6, 7} (ascending order)) and CDM group 2 (including ports {2, 3, 8, 9} (ascending order)), respectively. As the smallest DMRS port serial number in port subset 1 (i.e. ports {0, 1, 6, 7}) is 0, and is smaller than the smallest DMRS port serial number 2 in subset 2 (i.e. ports {2, 3, 8, 9}), the port subsets are further ordered; subset 1 is arranged prior to subset 2, and the ports are in the order of 0, 1, 6, 7, 2, 3, 8, 9; as a result, $P_0$, $P_1$, $P_2$, $P_3$ are equal to 0, 1, 6, 7, respectively, and $P_4$, $P_5$, $P_6$, $P_7$ are equal to 2, 3, 8, 9, respectively. Finally, the v data layers are mapped to the v DMRS ports according to the following formula:

$$\begin{bmatrix} y^{(p_0)}(i) \\ \vdots \\ y^{(p_{v-1})}(i) \end{bmatrix} = \begin{bmatrix} x^{(0)}(i) \\ \vdots \\ x^{(v-1)}(i) \end{bmatrix}.$$

That is, data layers 0, 1, 2, 3, 4, 5, 6, 7, 8 are mapped to DMRS ports 0, 1, 6, 7, 2, 3, 8, 9 used in transmission, respectively.

Mode 3-3.

Ordering within a port group: according to the CDM group relationships of the DMRS ports in the DMRS pattern, the DMRS ports indicated in the DCI are ordered in the respective CDM groups to which the ports belong, where the serial numbers of the DMRS ports in each group are arranged in ascending order (from small to large).

Ordering between port groups: the aforementioned subsets are arranged in ascending order based on the serial numbers of the CDM groups to which they belong.

The v DMRS ports are arranged into a vector according to ordering described above:

$$\begin{bmatrix} y^{(p_0)}(i) \\ \vdots \\ y^{(p_{v-1})}(i) \end{bmatrix}.$$

The v data layers are mapped to the v DMRS ports according to the following formula:

$$\begin{bmatrix} y^{(p_0)}(i) \\ \vdots \\ y^{(p_{v-1})}(i) \end{bmatrix} = \begin{bmatrix} x^{(0)}(i) \\ \vdots \\ x^{(v-1)}(i) \end{bmatrix}.$$

In one embodiment, for DMRS configuration type 2, if the number of data layers is v=8, and DMRS ports 0, 1, 6, 7 and ports 2, 3, 8, 9 in the DCI are allocated to the terminal, then from the DMRS pattern, the terminal learns that its DMRS ports are divided into two CDM groups corresponding to CDM group 1 (including ports {0, 1, 6, 7} (ascending order)) and CDM group 2 (including ports {2, 3, 8, 9} (ascending order)), respectively. Then, according to the serial number of the CDM group to which each subset belongs (of course, for case II in mode 3-1 described above, the subsets may also be ordered according to the serial number of the QCL group to which each subset belongs), the port subsets are further ordered (i.e. {CDM group 1, CDM group 2}), where subset 1 (i.e. ports {0, 1, 6, 7}) is arranged prior to subset 2 (i.e. port {2, 3, 8, 9}), and the ports are in the order of 0, 1, 6, 7, 2, 3, 8, 9; as a result, $P_0$, $P_1$, $P_2$, $P_3$ are equal to 0, 1, 6, 7, respectively, and $P_4$, $P_5$, $P_6$, $P_7$ are equal to 2, 3, 8, 9, respectively. Finally, the v data layers are mapped to the v DMRS ports according to the following formula:

$$\begin{bmatrix} y^{(p_0)}(i) \\ \vdots \\ y^{(p_{v-1})}(i) \end{bmatrix} = \begin{bmatrix} x^{(0)}(i) \\ \vdots \\ x^{(v-1)}(i) \end{bmatrix}.$$

That is, data layers 0, 1, 2, 3, 4, 5, 6, 7, 8 are mapped to DMRS ports 0, 1, 6, 7, 2, 3, 8, 9 used in transmission, respectively.

Mode 3-4 (comparable to mode 3-1 described above).

Case I: If there is only one QCL group or CDM group: the v DMRS ports allocated to the terminal in the DCI are ordered to ensure $P_0 < P_1 <, \ldots, P_{v-1}$.

The v data layers are mapped to the v DMRS ports according to the following formula:

$$\begin{bmatrix} y^{(p_0)}(i) \\ \vdots \\ y^{(p_{v-1})}(i) \end{bmatrix} = \begin{bmatrix} x^{(0)}(i) \\ \vdots \\ x^{(v-1)}(i) \end{bmatrix}.$$

In one embodiment, for DMRS configuration type 2, if the number of data layers is v=8, and DMRS ports 0, 1, 6, 7 and ports 2, 3, 8, 9 in the DCI are allocated to the terminal, then data layers 0, 1, 2, 3, 4, 5, 6, 7, 8 are mapped to the DMRS ports 0, 1, 2, 3, 6, 7, 8, 9 used in transmission.

Case II: If there is more than one QCL group:
Ordering within a port group: according to the QCL group relationships of the DMRS ports configured/indicated in step I, the DMRS ports indicated in the DCI are ordered in the respective QCL groups to which the DMRS ports belong, where the serial numbers of the DMRS ports in each QCL group are arranged in ascending order (from small to large). Ordering between port groups: in the port subsets obtained by grouping and ordering as described above, the port subsets are further ordered in ascending order (from small to large) based on the number of DMRS ports included in each subset, that is, a subset in which the number of DMRS ports is smaller is prior in the order (of course, a subset including a larger number of DMRS ports may also be prior in the order), where a subset is a set formed by DMRS ports in one QCL group.

The v DMRS ports are arranged into a vector according to ordering described above:

$$\begin{bmatrix} y^{(p_0)}(i) \\ \vdots \\ y^{(p_{v-1})}(i) \end{bmatrix}.$$

The v data layers are mapped to the v DMRS ports according to the following formula:

$$\begin{bmatrix} y^{(p_0)}(i) \\ \vdots \\ y^{(p_{v-1})}(i) \end{bmatrix} = \begin{bmatrix} x^{(0)}(i) \\ \vdots \\ x^{(v-1)}(i) \end{bmatrix}.$$

In one embodiment, for DMRS configuration type 2, if the number of data layers is v=7, in one embodiment, data layers 0, 1, 2, 3, 4, 5, 6, 7, respectively, and DMRS ports 0, 1, 6, 7 and ports 2, 3, 8 in the DCI are allocated to the terminal, then from step I, the terminal learns that its DMRS ports are divided into two QCL groups corresponding to subset 1 (including ports {0, 1, 6, 7} (ascending order)) and subset 2 (including ports {2, 3, 8} (ascending order)). respectively. As port subset 1 includes 4 DMRS ports, which is greater than the number (3) of DMRS ports in subset 2, the port subsets are further ordered to obtain {subset 2, subset 1}; that is, $P_0$, $P_1$, $P_2$ are equal to 2, 3, 8, respectively, and $P_3$, $P_4$, $P_5$, $P_6$, $P_7$ are equal to 0, 1, 6, 7, respectively. Finally, the v data layers are mapped to the v DMRS ports according to the following formula:

$$\begin{bmatrix} y^{(p_0)}(i) \\ \vdots \\ y^{(p_{v-1})}(i) \end{bmatrix} = \begin{bmatrix} x^{(0)}(i) \\ \vdots \\ x^{(v-1)}(i) \end{bmatrix}.$$

That is, the data layers 0, 1, 2, 3, 4, 5, 6, 7 are mapped to DMRS ports 2, 3, 8, 0, 1, 6, 7, respectively, used during transmission.

Mode 3-5 (Comparable to Mode 3-3):
Ordering within a port group: according to the CDM group relationships of the DMRS ports in the DMRS pattern, the DMRS ports indicated in the DCI are ordered in the respective CDM groups to which the ports belong, where the serial numbers of the DMRS ports in each group are arranged in ascending order (from small to large).
Ordering between port groups: the aforementioned subsets are arranged in the order of from smaller to larger number of DMRS ports included therein; that is, a subset including a smaller number of DMRS ports is prior in the order (of course, a subset including a larger number of DMRS ports may also be prior in the order).

The v DMRS ports are arranged into a vector according to ordering described above:

$$\begin{bmatrix} y^{(p_0)}(i) \\ \vdots \\ y^{(p_{v-1})}(i) \end{bmatrix}.$$

The v data layers are mapped to the v DMRS ports according to the following formula:

$$\begin{bmatrix} y^{(p_0)}(i) \\ \vdots \\ y^{(p_{v-1})}(i) \end{bmatrix} = \begin{bmatrix} x^{(0)}(i) \\ \vdots \\ x^{(v-1)}(i) \end{bmatrix}.$$

In one embodiment, for DMRS configuration type 2, if the number of data layers is v=7, in one embodiment, data layers 0, 1, 2, 3, 4, 5, 6, 7, respectively, and DMRS ports 0, 1, 6, 7 and ports 2, 3, 8 in the DCI are allocated to the terminal, then from the DMRS pattern, the terminal learns that its DMRS ports are divided into two CDM groups corresponding to CDM group 1 (including ports {0, 1, 6, 7} (ascending order)) and CDM group 2 (including ports {2, 3, 8} (ascending order)), respectively. Then, according to the number of ports included in each subset, the port subsets are further ordered (i.e. {CDM group 1, CDM group 2}); as a result, $P_0$, $P_1$, $P_2$ are equal to 2, 3, 8, respectively, and $P_3$, $P_4$, $P_5$, $P_6$, $P_7$ are equal to 0, 1, 6, 7, respectively. Finally, the v data layers are mapped to the v DMRS ports according to the following formula:

$$\begin{bmatrix} y^{(p_0)}(i) \\ \vdots \\ y^{(p_{v-1})}(i) \end{bmatrix} = \begin{bmatrix} x^{(0)}(i) \\ \vdots \\ x^{(v-1)}(i) \end{bmatrix}.$$

That is, the data layers 0, 1, 2, 3, 4, 5, 6, 7 are mapped to DMRS ports 2, 3, 8, 0, 1, 6, 7, respectively, used during transmission.

It should be noted that ordering from small to large mentioned anywhere of the foregoing embodiments can be similarly replaced with ordering from large to small (descending order), and the specific way of ordering is not limited in the embodiments of the present application. Furthermore, the embodiments of the present application are not limited to the foregoing several methods for determining a vector composed of v DMRS ports, nor do they define the specific manners of mapping between the v DMRS ports and the v data layers.

In addition, the preset DMRS port ordering rule described in the embodiments of the present application can be preset on the network side and the on the terminal side; that is, the same DMRS port ordering rule is set on both sides; and the same formula can be set on the network side and the terminal side, to map the data layers to the DMRS ports used in transmission in the same way.

In addition, the aforementioned steps II and III can be combined into one step.

Figure 5:
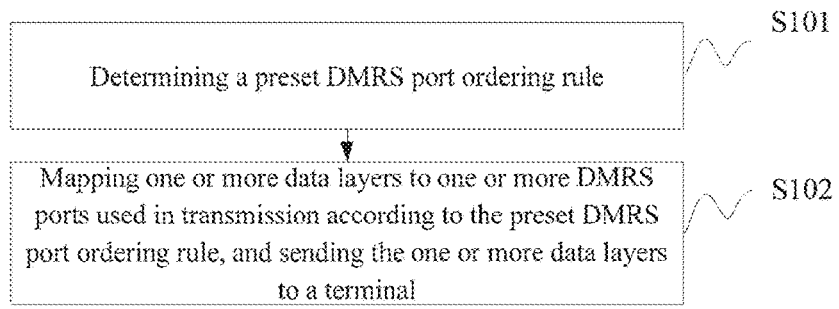
FIG. 5 is a flow diagram of a data sending method provided in an embodiment of the present application.

In summary, referring to FIG. 5, on the network side, a data sending method provided in an embodiment of the present application includes the following operations.

S101, determining a preset demodulation reference signal (DMRS) port ordering rule.

S102, mapping one or more data layers to one or more DMRS ports used in transmission according to the preset DMRS port ordering rule, and sending the one or more data layers to a terminal.

By adopting the data sending method, a preset demodulation reference signal (DMRS) port ordering rule is determined; and a data layer is mapped to a DMRS port used in transmission according to the preset DMRS port ordering rule, and the data layer is sent to a terminal, to map a data layer to a DMRS port used in transmission according to a preset DMRS port ordering rule, and perform transmission.

In one embodiment, mapping the one or more data layers to the one or more DMRS ports used in transmission according to the preset DMRS port ordering rule, and sending the one or more data layers to the terminal includes: based on a number v of multiple-input multiple-output (MIMO) parallel transmission data layers, arranging the one or more data layers into the following transmission signal vector according to serial numbers:

$$\begin{bmatrix} x^{(0)}(i) \\ \vdots \\ x^{(v-1)}(i) \end{bmatrix};$$

determining the following signal vector by v DMRS ports:

$$\begin{bmatrix} y^{(p_0)}(i) \\ \vdots \\ y^{(p_{v-1})}(i) \end{bmatrix};$$

and mapping the v data layers to the v DMRS ports according to the following formula, and sending the data layers:

$$\begin{bmatrix} y^{(p_0)}(i) \\ \vdots \\ y^{(p_{v-1})}(i) \end{bmatrix} = \begin{bmatrix} x^{(0)}(i) \\ \vdots \\ x^{(v-1)}(i) \end{bmatrix}.$$

$i=0, 1, \ldots, M_{symb}^{layer}-1$, where i represents the ith modulation symbol among $M_{symb}^{layer}$ modulation symbols to be transmitted in each data layer; and $P_0, \ldots, P_{v-1}$ represents serial numbers of the v DMRS ports.

In one embodiment, the method further includes: determining quasi-co-location (QCL) group information of the one or more DMRS ports; and notifying the terminal of the QCL group information.

In one embodiment, if there is only one QCL group or CDM group, then $P_0 < P_1 <, \ldots, P_{v-1}$. Examples are case I in mode 3-1 and case I in mode 3-4.

In one embodiment, if there are a plurality of QCL groups or CDM groups, the signal vector formed by the v DMRS ports is determined according to an ordering result of the serial numbers of the v DMRS ports. Examples are case II in mode 3-1; case II in mode 3-4; and mode 3-2, mode 3-3, and mode 3-5.

In one embodiment, the ordering result is obtained by: ordering, within each subset, the serial numbers of DMRS ports in the DMRS port subset to obtain an ordering result, within each subset, of the DMRS port serial numbers corresponding to the DMRS port subset; and performing ordering between DMRS port subsets based on the ordering result, within each subset, of the DMRS port serial numbers corresponding to the DMRS port subset, where each DMRS port subset is a set formed by DMRS ports included in a CDM group or QCL group.

In one embodiment, ordering between DMRS port subsets is performed by: performing ordering between DMRS port subsets based on the smallest DMRS port serial number in each DMRS port subset, such as in case II of mode 3-1 and mode 3-2 described above; or performing ordering between DMRS port subsets based on a serial number of the CDM group or QCL group corresponding to each DMRS port subset, such as in mode 3-3 described above; or performing ordering between DMRS port subsets based on the number of DMRS ports included in each DMRS port subset, such as in mode 3-5 described above.

In one embodiment, the QCL group information includes one of the following information (that is, content described in the aforementioned mode 1-1, 1-2, or 1-3); in a DMRS pattern, an identifier corresponding to a reference signal having a QCL relationship with each code division multiplexing (CDM) group, where DMRS ports included in a CDM group having the same identifier form a same QCL group, and the identifiers corresponding to DMRS ports of different QCL groups are different, and the identifiers corresponding to DMRS ports of a same QCL group are same; a CDM group included in a QCL group; and a list of DMRS ports included in a QCL group.

In one embodiment, the QCL group information of the one or more DMRS ports is notified to the terminal in a broadcast, multicast or terminal-specific manner, through radio resource control (RRC) configuration or a media access control (MAC) control element (CE) or downlink control information (DCI).

Figure 6:
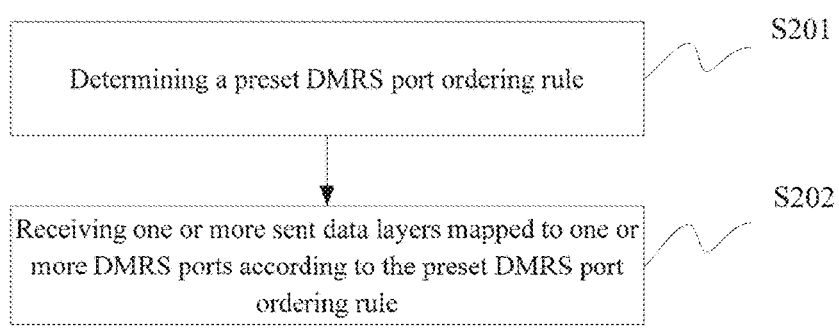
FIG. 6 is a flow diagram of a data receiving method provided in an embodiment of the present application.

Correspondingly, referring to FIG. 6, at the terminal side, a data receiving method provided in an embodiment of the present application includes the following operations.

S201, determining a preset DMRS port ordering rule.

S202, receiving one or more sent data layers mapped to one or more DMRS ports according to the preset DMRS port ordering rule.

In one embodiment, receiving one or more sent data layers mapped to one or more DMRS ports according to the preset DMRS port ordering rule includes:

based on a number v of multiple-input multiple-output (MIMO) parallel transmission data layers, arranging the one or more data layers into the following transmission signal vector according to serial numbers:

$$\begin{bmatrix} x^{(0)}(i) \\ \vdots \\ x^{(v-1)}(i) \end{bmatrix};$$

determining the following signal vector formed by v DMRS ports:

$$\begin{bmatrix} y^{(P_0)}(i) \\ \vdots \\ y^{(P_{v-1})}(i) \end{bmatrix};$$

and
receiving the one or more sent data layers mapped to the one or more DMRS ports used in transmission, according to the following formula:

$$\begin{bmatrix} y^{(P_0)}(i) \\ \vdots \\ y^{(P_{v-1})}(i) \end{bmatrix} = \begin{bmatrix} x^{(0)}(i) \\ \vdots \\ x^{(v-1)}(i) \end{bmatrix}.$$

$i=0, 1, \ldots, M_{symb}^{layer}-1$, i represents the ith modulation symbol among $M_{symb}^{layer}$ modulation symbols to be transmitted in each data layer; and $P_0, \ldots, P_{v-1}$ represents serial numbers of the v DMRS ports.

In one embodiment, the method further includes: receiving quasi-co-location (QCL) group information of the one or more DMRS ports notified by the network side.

The terminal can further determine an ordering manner of the DMRS ports occupied by the terminal, according to the QCL group information of the DMRS ports, in conjunction with a preset ordering rule of DMRS port. Specifically, in one embodiment, content of ordering within a port group and ordering between port groups is involved in each of the aforementioned modes.

In one embodiment, if there is only one QCL group or CDM group, then $P_0 < P_1 <, \ldots, P_{v-1}$.

In one embodiment, if there are a plurality of QCL groups or CDM groups, the signal vector formed by the v DMRS ports is determined according to an ordering result of the serial numbers of the v DMRS ports.

In one embodiment, the ordering result is obtained by: ordering, within each subset, the serial numbers of DMRS ports in the DMRS port subset to obtain an ordering result, within each subset, of the DMRS port serial numbers corresponding to the DMRS port subset; and performing ordering between DMRS port subsets based on the ordering result, within each subset, of the DMRS port serial numbers corresponding to the DMRS port subset, where each DMRS port subset is a set formed by DMRS ports included in a CDM group or QCL group.

In one embodiment, ordering between DMRS port subsets is performed by: performing ordering between DMRS port subsets based on the smallest DMRS port serial number in each DMRS port subset; or performing ordering between DMRS port subsets based on a serial number of the CDM group or QCL group corresponding to each DMRS port subset; or performing ordering between DMRS port subsets based on the number of DMRS ports included in each DMRS port subset.

In one embodiment, the QCL group information includes one of the following information: in a DMRS pattern, an identifier corresponding to a reference signal having a QCL relationship with each code division multiplexing (CDM) group, where DMRS ports included in a CDM group having the same identifier form a same QCL group, and the identifiers corresponding to DMRS ports of different QCL groups are different, and the identifiers corresponding to DMRS ports of a same QCL group are same; a CDM group included in a QCL group; and a list of DMRS ports included in a QCL group.

In one embodiment, the notification is received in a broadcast, multicast, or terminal-specific manner, and the QCL group information of the one or more DMRS ports is acquired from radio resource control (RRC) configuration or a media access control (MAC) control element (CE) or downlink control information (DCI) in the notification.

Figure 7:
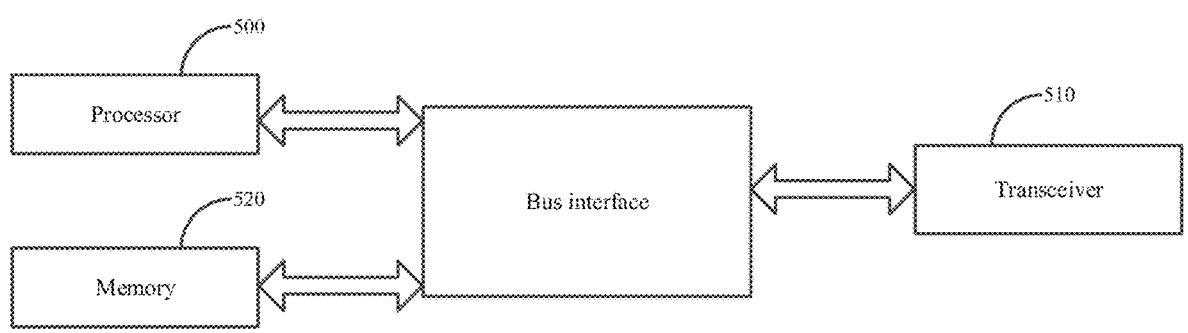
FIG. 7 is a structure diagram of a data sending apparatus provided in an embodiment of the present application.

On the network side, referring to FIG. 7, a data sending apparatus provided in an embodiment of the present application includes a memory 520 and a processor 500, where the memory 520 is configured to store program instructions, and the processor 500 is configured to call the program instructions stored in the memory 520, and execute the following steps according to obtained programs: determining a DMRS port ordering rule; and mapping one or more data layers to one or more DMRS ports used in transmission according to the preset DMRS port ordering rule, and sending the one or more data layers to a terminal through a transceiver 510.

It should be noted that a bus interface, the transceiver 510, and the like in FIG. 7 can all exist as optional devices in a data sending apparatus provided in the embodiment of the present application, and are not indispensable.

In one embodiment, the processor 500 mapping the one or more data layers to the one or more DMRS ports used in transmission according to the preset DMRS port ordering rule, and sending the one or more data layers to the terminal includes:
based on a number v of multiple-input multiple-output (MIMO) parallel transmission data layers, arranging the one or more data layers into the following transmission signal vector according to serial numbers:

$$\begin{bmatrix} x^{(0)}(i) \\ \vdots \\ x^{(v-1)}(i) \end{bmatrix};$$

determining the following signal vector formed by v DMRS ports:

$$\begin{bmatrix} y^{(P_0)}(i) \\ \vdots \\ y^{(P_{v-1})}(i) \end{bmatrix};$$

mapping the v data layers to the v DMRS ports according to the following formula, and sending the data layers to a terminal:

$$\begin{bmatrix} y^{(P_0)}(i) \\ \vdots \\ y^{(P_{v-1})}(i) \end{bmatrix} = \begin{bmatrix} x^{(0)}(i) \\ \vdots \\ x^{(v-1)}(i) \end{bmatrix}.$$

$i=0, 1, \ldots, M_{symb}^{layer}-1$, i represents the ith modulation symbol among $M_{symb}^{layer}$ modulation symbols to be transmitted in each data layer; and $P_0, \ldots, P_{v-1}$ represents serial numbers of the v DMRS ports.

In one embodiment, the processor 500 is further configured to: determine quasi-co-location (QCL) group information of the one or more DMRS ports; and notify the terminal of the QCL group information.

In one embodiment, if there is only one QCL group or CDM group, then $P_0 < P_1 <, \ldots, P_{v-1}$.

In one embodiment, if there are a plurality of QCL groups or CDM groups, the signal vector formed by the v DMRS ports is determined according to an ordering result of the serial numbers of the v DMRS ports.

In one embodiment, the ordering result is obtained by: ordering, within each subset, the serial numbers of DMRS ports in the DMRS port subset to obtain an ordering result, within each subset, of the DMRS port serial numbers corresponding to the DMRS port subset; and performing ordering between DMRS port subsets based on the ordering result, within each subset, of the DMRS port serial numbers corresponding to the DMRS port subset; where each DMRS port subset is a set formed by DMRS ports included in a CDM group or QCL group.

In one embodiment, ordering between DMRS port subsets is performed by: performing ordering between DMRS port subsets based on the smallest DMRS port serial number in each DMRS port subset; or performing ordering between DMRS port subsets based on a serial number of the CDM group or QCL group corresponding to each DMRS port subset; or performing ordering between DMRS port subsets based on the number of DMRS ports included in each DMRS port subset.

In one embodiment, the QCL group information includes one of the following information: in a DMRS pattern, an identifier corresponding to a reference signal having a QCL relationship with each code division multiplexing (CDM) group, where DMRS ports included in a CDM group having the same identifier form a same QCL group, and the identifiers corresponding to DMRS ports of different QCL groups are different, and the identifiers corresponding to DMRS ports of a same QCL group are same; a CDM group included in a QCL group; and a list of DMRS ports included in a QCL group.

In one embodiment, the processor 500 notifies the QCL group information of the one or more DMRS ports to the terminal in a broadcast, multicast or terminal-specific manner, through radio resource control (RRC) configuration or a media access control (MAC) control element (CE) or downlink control information (DCI).

The transceiver 510 is configured to receive and send data under the control of the processor 500.

In FIG. 7, the bus architecture can include any number of interconnected buses and bridges, linking together various circuits of one or more processors represented by the processor 500 and a memory represented by the memory 520. The bus architecture may also link together various other circuits of a peripheral device, a voltage stabilizer, a power management circuit and the like, which are all known in the art and thus not further described herein. A bus interface provides an interface. The transceiver 510 can be multiple elements, including a transmitter and a transceiver, providing a device for communicating with various other apparatuses over a transmission medium. The processor 500 is responsible for managing the bus architecture and general processing, and the memory 520 can store data used by the processor 500 when the processor performs operations.

The processor 500 can be a central processing device (CPU), an application specific integrated circuit (ASIC), a field-programmable gate array (FPGA), or a complex programmable logic device (CPLD).

Figure 8:
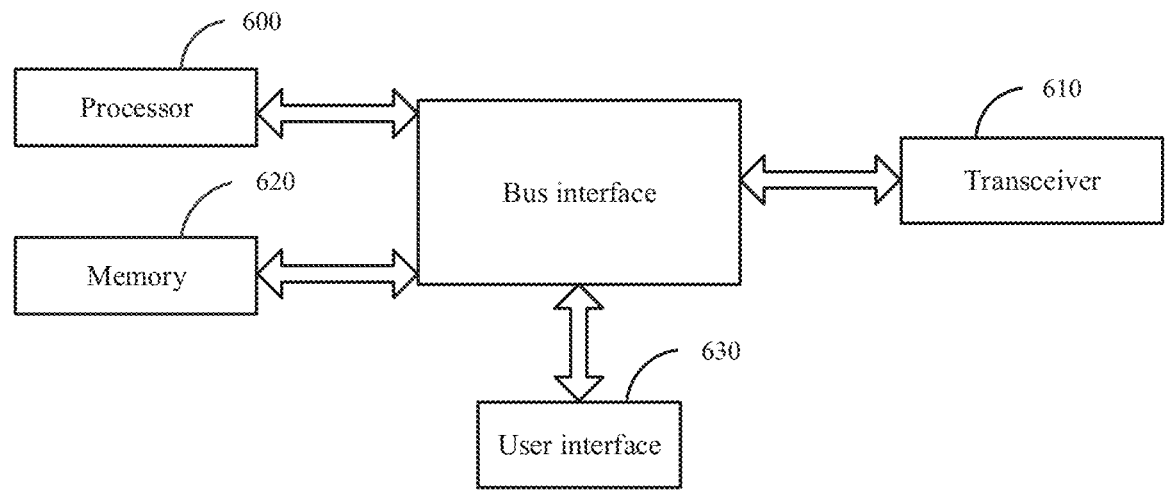
FIG. 8 is a structure diagram of a data receiving apparatus provided in an embodiment of the present application.

Referring to FIG. 8, on the terminal side, a data receiving apparatus provided in an embodiment of the present application includes a memory 620 and a processor 600, where the memory 620 is configured to store program instructions, and the processor 600 is configured to call the program instructions stored in the memory 620, and execute the following steps according to an obtained program: determining a preset DMRS port ordering rule, and receiving, by a transceiver 610, one or more sent data layers mapped to one or more DMRS ports according to the preset DMRS port ordering rule.

It should be noted that the devices other than the memory 620 and the processor 600 in FIG. 8 are optional devices that exist in a data receiving apparatus provided in the embodiment of the present application, and are not indispensable devices.

In one embodiment, receiving one or more sent data layers mapped to one or more DMRS ports according to the preset DMRS port ordering rule includes:
based on a number v of multiple-input multiple-output (MIMO) parallel transmission data layers, arranging the one or more data layers into the following transmission signal vector according to serial numbers:

$$\begin{bmatrix} x^{(0)}(i) \\ \vdots \\ x^{(v-1)}(i) \end{bmatrix};$$

determining the following signal vector formed by v DMRS ports:

$$\begin{bmatrix} y^{(p_0)}(i) \\ \vdots \\ y^{(p_{v-1})}(i) \end{bmatrix};$$

and
receiving a sent data layer mapped to a DMRS port used in transmission, according to the following formula:

$$\begin{bmatrix} y^{(p_0)}(i) \\ \vdots \\ y^{(p_{v-1})}(i) \end{bmatrix} = \begin{bmatrix} x^{(0)}(i) \\ \vdots \\ x^{(v-1)}(i) \end{bmatrix}.$$

$i = 0, 1, \ldots, M_{symb}^{layer} - 1$, i represents the ith modulation symbol among $M_{symb}^{layer}$ modulation symbols to be transmitted in each data layer; and $P_0, \ldots, P_{v-1}$ represents serial numbers of the v DMRS ports.

In one embodiment, the processor 600 is further configured to receive quasi-co-located QCL group information of the one or more DMRS ports notified by the network side.

In one embodiment, if there is only one QCL group or CDM group, then $P_0 < P_1 <, \ldots, P_{v-1}$.

In one embodiment, if there are a plurality of QCL groups or CDM groups, the signal vector formed by the v DMRS ports is determined according to an ordering result of the serial numbers of the v DMRS ports.

In one embodiment, the ordering result is obtained by: ordering, within each subset, the serial numbers of DMRS ports in the DMRS port subset to obtain an ordering result, within each subset, of the DMRS port serial numbers corresponding to the DMRS port subset; and performing ordering between DMRS port subsets based on the ordering result, within each subset, of the DMRS port serial numbers corresponding to the DMRS port subset; where each DMRS port subset is a set formed by DMRS ports included in a CDM group or QCL group.

In one embodiment, the processor 600 performs ordering between DMRS port subsets by: performing ordering between DMRS port subsets based on the smallest DMRS port serial number in each DMRS port subset; or performing ordering between DMRS port subsets based on a serial number of the CDM group or QCL group corresponding to each DMRS port subset; or performing ordering between DMRS port subsets based on the number of DMRS ports included in each DMRS port subset.

In one embodiment, the QCL group information includes one of the following information: in a DMRS pattern, an identifier corresponding to a reference signal having a QCL relationship with each code division multiplexing (CDM) group, where DMRS ports included in a CDM group having the same identifier form a same QCL group, and the identifiers corresponding to DMRS ports of different QCL groups are different, and the identifiers corresponding to DMRS ports of a same QCL group are same; a CDM group included in a QCL group; and a list of DMRS ports included in a QCL group.

In one embodiment, the processor 600 receives the notification in a broadcast, multicast, or terminal-specific manner, and acquires the QCL group information of the one or more DMRS ports from radio resource control (RRC) configuration or a media access control (MAC) control element (CE) or downlink control information (DCI) in the notification.

The transceiver 610 is configured to receive and send data under the control of the processor 600.

In FIG. 8, the bus architecture can include any number of interconnected buses and bridges, linking together various circuitries of one or more processors represented by the processor 600 and a memory represented by the memory 620. The bus architecture may also link together various other circuitry of a peripheral device, a voltage stabilizer, a power management circuit and the like, which are all known in the art and thus not further described herein. A bus interface provides an interface. The transceiver 610 can be multiple elements, including a transmitter and a receiver, providing a device for communicating with various other apparatuses over a transmission medium. For different user equipment, a user interface 630 may also be an interface to externally or internally connecting a required device, including but not limited to a keypad, a display, a speaker, a microphone, a joystick, or the like.

The processor 600 is responsible for managing the bus architecture and general processing, and the memory 620 may store data used by the processor 600 when the processor performs operations.

In one embodiment, the processor 600 can be a CPU (Central Processing Device), an ASIC (Application Specific Integrated Circuit), an FPGA (Field-Programmable Gate Array) or a CPLD (Complex Programmable Logic Device).

Figure 9:
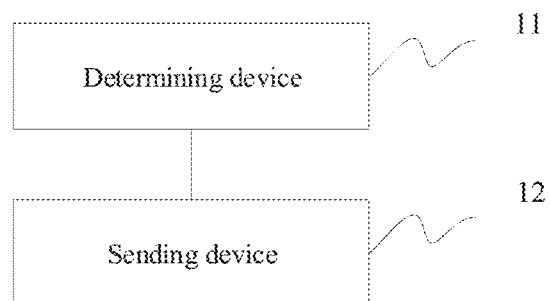
FIG. 9 is a structure diagram of another data sending apparatus provided in an embodiment of the present application.

On the network side, referring to FIG. 9, another data sending apparatus provided in an embodiment of the present application includes: a determining device 11 configured to determine a preset demodulation reference signal (DMRS) port ordering rule; and a sending device 12 configured to map one or more data layers to one or more DMRS ports used in transmission according to the preset DMRS port ordering rule, and send the one or more data layers to a terminal.

Figure 10:
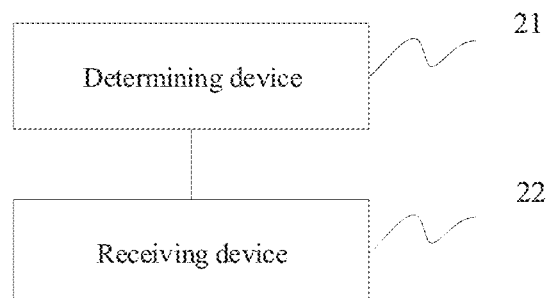
FIG. 10 is a structure diagram of another data receiving apparatus provided in an embodiment of the present application.

On the terminal side, referring to FIG. 10, another data receiving apparatus provided in an embodiment of the present application includes: a determining device 21 configured to determine a preset DMRS port ordering rule; and a receiving device 22 configured to receive one or more sent data layer mapped to one or more DMRS ports according to the preset DMRS port ordering rule.

An embodiment of the present application provides a computer storage medium configured to store computer program instructions for the aforementioned computing device, including a program for executing the aforementioned information indicating or determining method.

The computer storage medium may be any available medium or data storage device that can be accessed by a computer, including but not limited to a magnetic memory (such as a floppy disk, hard disk, magnetic tape, magneto-optical disk (MO), etc.), an optical memory (such as a CD, DVD, BD, HVD, etc.), and a semiconductor memory (such as an ROM. EPROM, EEPROM, non-volatile memory (NAND Flash), and a solid-state drive (SSD)).

The method provided in the embodiment of the present application may be applied to a terminal device, and may also be applied to a network device.

The terminal device may also be called user equipment ("UE"), mobile station ("MS"), mobile terminal, etc. In one embodiment, the terminal can have the ability to communicate with one or more core networks through a radio access network (RAN). In one embodiment, the terminal may be a mobile phone (or a "cellular" phone), or a computer with a mobile property. In one embodiment, the terminal may also be a portable, pocket-sized, handheld, computer-built or vehicle-mounted mobile apparatus.

The network device can be a base station (e.g. an access point), which is a device, in an access network, that communicates with a wireless terminal through one or more sectors at an air interface. The base station can be used to perform conversion between a received air frame and IP packet as a router between the wireless terminal and the rest of the access network, where the rest of the access network can include an Internet Protocol (IP) network. The base station may also coordinate attribute management of the air interface. In one embodiment, the base station may be a base transceiver station (BTS) in GSM or CDMA, or may be a base station (NodeB) in WCDMA, or may also be an evolved base station (eNodeB or eNB or e-NodeB, evolutional Node B) in LTE, but the embodiments of the present disclosure are not limited thereto. The embodiments of the present disclosure can be provided as a method, a system or a computer program product. Therefore, the present application can be in the form of an all-hardware embodiment, an all-software embodiment, or a software and hardware combined embodiment. Moreover, the present application can be in the form of a computer program product implemented on one or more computer usable storage media (including but not limited to magnetic disk memories and optical memories) containing computer usable program codes.

The present application is described with reference to the flow diagrams and/or block diagrams of the method, device (system) and computer program product according to the embodiments of the present disclosure. It should be understood that each process and/or block in the flow diagrams and/or block diagrams, as well as combinations of processes and/or blocks in the flow diagrams and/or block diagrams can be implemented by computer program instructions. The computer program instructions can be provided to a processor of a general purpose computer, a special purpose computer, an embedded processor or other programmable data processing device to produce a machine, so that the instructions processed by the processor of the computer or other programmable data processing device generates a device for achieving functions specified in one or more processes of the flow diagrams and/or one or more blocks of the block diagrams.

The computer program instructions may also be stored in a computer readable memory that can instruct a computer or other programmable data processing device to operate in a specified manner, so that the instructions stored in the computer readable memory generates a manufactured product containing an instruction device, where the instruction device achieves the functions specified in one or more processes of the flow diagrams and/or one or more blocks of the block diagrams.

The computer program instructions may also be loaded to a computer or other programmable data processing device, so that a series of operation steps are executed on the computer or other programmable data processing device to generate computer implemented processing, so that the instructions executed on the computer or other programmable data processing device provide steps for achieving functions specified in one or more processes of the flow diagrams and/or one or more blocks of the block diagrams.

The invention claimed is:

1. A data transmission method, comprising:
   determining a preset demodulation reference signal (DMRS) port ordering rule; and
   mapping one or more data layers to one or more DMRS ports used in transmission according to the preset DMRS port ordering rule, and sending the one or more data layers to a terminal;
   wherein the mapping the one or more data layers to the one or more DMRS ports used in transmission according to the preset DMRS port ordering rule, and sending the one or more data layers to the terminal comprises:
   based on a number v of multiple-input multiple-output (MIMO) parallel transmission data layers, arranging the one or more data layers into a following transmission signal vector according to serial numbers:

$$\begin{bmatrix} x^{(0)}(i) \\ \vdots \\ x^{(v-1)}(i) \end{bmatrix};$$

determining a following signal vector formed by v number of DMRS ports:

$$\begin{bmatrix} y^{(p_0)}(i) \\ \vdots \\ x^{(p_{v-1})}(i) \end{bmatrix};$$

and
mapping a v number of data layers to the v number of DMRS ports according to a following formula, and sending the v number of data layers to the terminal:

$$\begin{bmatrix} y^{(p_0)}(i) \\ \vdots \\ x^{(p_{v-1})}(i) \end{bmatrix} = \begin{bmatrix} x^{(0)}(i) \\ \vdots \\ x^{(v-1)}(i) \end{bmatrix};$$

wherein, $i=0, 1, \ldots, M_{symb}^{layer}-1$, i represents the ith modulation symbol among $M_{symb}^{layer}$ number of modulation symbols to be transmitted in each data layer; and $P_0, \ldots, P_{v-1}$ represents serial numbers of the v number of DMRS ports; and a data layer $x^{(0)}(i)$ is mapped to a DMRS port $y^{(p_0)}(i)$ used in transmission, ..., a data layer $x^{(v-1)}(i)$ is mapped to a DMRS port $y^{(p_{v-1})}(i)$ used in transmission;
wherein the method further comprises:
determining quasi-co-location (QCL) group information of the one or more DMRS ports; and
notifying the terminal of the QCL group information;
wherein when there are a plurality of QCL groups or CDM groups, the signal vector formed by the v number of DMRS ports is determined according to an ordering result of the serial numbers of the v number of DMRS ports;
wherein the ordering result is obtained by:
ordering serial numbers of DMRS ports in each DMRS port subset to obtain an ordering result of the DMRS port serial numbers corresponding to each DMRS port subset; and
performing ordering between DMRS port subsets based on the ordering result of the DMRS port serial numbers corresponding to the each DMRS port subset;
wherein the each DMRS port subset is a set formed by DMRS ports included in a CDM group or QCL group;
wherein ordering between DMRS port subsets is performed by:
performing ordering between DMRS port subsets based on an order of from smaller to larger number of DMRS ports included in the each DMRS port subset; or
performing ordering between DMRS port subsets based on an order of from larger to smaller number of DMRS ports included in the each DMRS port subset.

2. The method according to claim 1, wherein QCL group information comprises one of following information:
   in a DMRS pattern, an identifier corresponding to a reference signal having a QCL relationship with each code division multiplexing (CDM) group, wherein DMRS ports included in CDM groups having the same identifier form a same QCL group, and identifiers corresponding to DMRS ports of different QCL groups are different, and identifiers corresponding to DMRS ports of the same QCL group are same;
   a CDM group included in a QCL group; and
   a list of DMRS ports included in a QCL group.

3. The method according to claim 1, wherein QCL group information of the one or more DMRS ports is notified to the terminal in a broadcast, multicast or terminal-specific manner, through radio resource control (RRC) configuration or a media access control (MAC) control element (CE) or downlink control information (DCI).

4. A data receiving method, comprising:
   determining a preset demodulation reference signal (DMRS) port ordering rule; and
   receiving one or more transmitted data layers mapped to one or more DMRS ports according to the preset DMRS port ordering rule;

wherein the receiving one or more transmitted data layers mapped to one or more DMRS ports according to the preset DMRS port ordering rule comprises:

based on a number v of multiple-input multiple-output (MIMO) parallel transmission data layers, arranging the one or more data layers into a following transmission signal vector according to serial numbers:

$$\begin{bmatrix} x^{(0)}(i) \\ \vdots \\ x^{(v-1)}(i) \end{bmatrix};$$

determining a following signal vector formed by v number of DMRS ports:

$$\begin{bmatrix} y^{(P_0)}(i) \\ \vdots \\ x^{(P_{v-1})}(i) \end{bmatrix};$$

and receiving the one or more transmitted data layers mapped to the one or more DMRS ports used in transmission, according to a following formula:

$$\begin{bmatrix} y^{(P_0)}(i) \\ \vdots \\ x^{(P_{v-1})}(i) \end{bmatrix} = \begin{bmatrix} x^{(0)}(i) \\ \vdots \\ x^{(v-1)}(i) \end{bmatrix};$$

wherein, i=0, 1, . . . , $M_{symb}^{layer}$−1, i represents the ith modulation symbol among $M_{symb}^{layer}$ number of modulation symbols to be transmitted in each data layer; and $P_0, \ldots, P_{v-1}$ represents serial numbers of the v number of DMRS ports; and a data layer $x^{(0)}(i)$ is mapped to a DMRS port $y^{(P_0)}(i)$ used in transmission, . . . , a data layer $x^{(v-1)}(i)$ is mapped to a DMRS port $y^{(P_{v-1})}(i)$ used in transmission;

wherein the method further comprises:

receiving quasi-co-location (QCL) group information of the one or more DMRS ports notified by a network side;

wherein when there are a plurality of QCL groups or CDM groups, the signal vector formed by the v number of DMRS ports is determined according to an ordering result of the serial numbers of the v number of DMRS ports;

wherein the ordering result is obtained by:

ordering serial numbers of DMRS ports in each DMRS port subset to obtain an ordering result of the DMRS port serial numbers corresponding to the each DMRS port subset; and performing ordering between DMRS port subsets based on the ordering result of the DMRS port serial numbers corresponding to the each DMRS port subset;

wherein the each DMRS port subset is a set formed by DMRS ports included in a CDM group or QCL group;

wherein ordering between DMRS port subsets is performed by:

performing ordering between DMRS port subsets based on an order of from smaller to larger number of DMRS ports included in the each DMRS port subset; or performing ordering between DMRS port subsets based on an order of from larger to smaller number of DMRS ports included in the each DMRS port subset.

5. The method according to claim 4, wherein QCL group information comprises one of following information:

in a DMRS pattern, an identifier corresponding to a reference signal having a QCL relationship with each code division multiplexing (CDM) group, wherein DMRS ports included in a CDM group having the same identifier form a same QCL group, and identifiers corresponding to DMRS ports of different QCL groups are different, and identifiers corresponding to DMRS ports of the same QCL group are same;

a CDM group included in a QCL group; and a list of DMRS ports included in a QCL group.

6. The method according to claim 4, wherein the notification is received in a broadcast, multicast, or terminal-specific manner, and the QCL group information of the one or more DMRS ports is acquired from radio resource control (RRC) configuration or a media access control (MAC) control element (CE) or downlink control information (DCI) in the notification.

7. A data receiving apparatus, comprising: a memory and a processor, wherein the memory is configured to store program instructions, and the processor is configured to call the program instructions stored in the memory, and execute the data receiving method of claim 4.

8. A data transmission apparatus, comprising a memory and a processor, wherein the memory is configured to store program instructions, and the processor is configured to call the program instructions stored in the memory, and execute the following steps according to obtained programs:

determining a preset demodulation reference signal (DMRS) port ordering rule; and mapping one or more data layers to one or more DMRS ports used in transmission according to the preset DMRS port ordering rule, and sending the one or more data layers to a terminal;

wherein the mapping the one or more data layers to the one or more DMRS ports used in transmission according to the preset DMRS port ordering rule, and sending the one or more data layers to the terminal comprises:

based on a number v of multiple-input multiple-output (MIMO) parallel transmission data layers, arranging the one or more data layers into a following transmission signal vector according to serial numbers:

$$\begin{bmatrix} x^{(0)}(i) \\ \vdots \\ x^{(v-1)}(i) \end{bmatrix};$$

determining a following signal vector formed by v number of DMRS ports:

$$\begin{bmatrix} y^{(P_0)}(i) \\ \vdots \\ y^{(P_{v-1})}(i) \end{bmatrix};$$

and mapping a v number of data layers to the v number of DMRS ports according to a following formula, and sending the v number of data layers to the terminal:

$$\begin{bmatrix} y^{(p_0)}(i) \\ \vdots \\ y^{(p_{v-1})}(i) \end{bmatrix} = \begin{bmatrix} x^{(0)}(i) \\ \vdots \\ x^{(v-1)}(i) \end{bmatrix};$$

wherein, $i=0, 1, \ldots, M_{symb}^{layer}-1$, i represents the ith modulation symbol among $M_{symb}^{layer}$ number of modulation symbols to be transmitted in each data layer; and $P_0, \ldots, P_{v-1}$ represents serial numbers of the v number of DMRS ports; and a data layer $x^{(0)}(i)$ is mapped to a DMRS port $y^{(p_0)}(i)$ used in transmission, ..., a data layer $x^{(v-1)}(i)$ is mapped to a DMRS port $y^{(p_{v-1})}(i)$ used in transmission;

determining quasi-co-location (QCL) group information of the one or more DMRS ports; and notifying the terminal of the QCL group information;

wherein when there are a plurality of QCL groups or CDM groups, the signal vector formed by the v number of DMRS ports is determined according to an ordering result of the serial numbers of the v number of DMRS ports;

wherein the ordering result is obtained by:

ordering serial numbers of DMRS ports in each DMRS port subset to obtain an ordering result of the DMRS port serial numbers corresponding to each DMRS port subset; and performing ordering between DMRS port subsets based on the ordering result of the DMRS port serial numbers corresponding to the each DMRS port subset;

wherein the each DMRS port subset is a set formed by DMRS ports included in a CDM group or QCL group;

wherein ordering between DMRS port subsets is performed by:

performing ordering between DMRS port subsets based on an order of from smaller to larger number of DMRS ports included in the each DMRS port subset; or performing ordering between DMRS port subsets based on an order of from larger to smaller number of DMRS ports included in the each DMRS port subset.

\* \* \* \* \*